(12) United States Patent
Schrage

(10) Patent No.: US 6,850,609 B1
(45) Date of Patent: Feb. 1, 2005

(54) METHODS AND APPARATUS FOR PROVIDING SPEECH RECORDING AND SPEECH TRANSCRIPTION SERVICES

(75) Inventor: James R. Schrage, Ridgefield, CT (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 09/178,295

(22) Filed: Oct. 23, 1998

Related U.S. Application Data (60) Provisional application No. 60/065,952, filed on Oct. 28, 1997.

(51) Int. Cl.$^7$ .......................... H04M 3/42; H04M 1/64; G10L 15/26; G10L 17/00
(52) U.S. Cl. ............................ 379/202.01; 379/88.01; 379/88.14; 379/158; 704/235; 704/246
(58) Field of Search .......................... 379/88.11, 88.01, 379/88.26, 88.07, 88.13, 100.01, 158, 202.01–206.01; 704/235, 231; 348/14.08, 14.09

(56) References Cited

U.S. PATENT DOCUMENTS

| | | | |
|---|---|---|---|
| 5,526,407 A | * | 6/1996 | Russell et al. ............ 379/88.01 |
| 5,559,875 A | * | 9/1996 | Bieselin ....................... 379/202 |
| 5,586,172 A | * | 12/1996 | Sakurai ........................ 379/67 |
| 5,606,643 A | * | 2/1997 | Balasubramanian et al. ........................... 704/243 |
| 5,619,555 A | * | 4/1997 | Fenton et al. ............. 379/88.11 |
| 5,649,060 A | * | 7/1997 | Ellozy et al. ............. 369/25.01 |
| 5,710,591 A | * | 1/1998 | Bruno et al. .............. 348/14.09 |
| 5,870,454 A | * | 2/1999 | Dahlen .................. 379/100.01 |
| 6,076,059 A | * | 6/2000 | Glickman et al. ........... 704/252 |
| 6,100,882 A | * | 8/2000 | Sharman et al. ............. 704/235 |
| 6,278,772 B1 | * | 8/2001 | Bowater ................... 379/88.13 |
| 6,304,648 B1 | * | 10/2001 | Chang ................... 379/202.01 |
| 6,327,343 B1 | * | 12/2001 | Epstein et al. ........... 379/88.01 |
| 6,349,303 B1 | * | 2/2002 | Saito .......................... 707/101 |
| 6,389,114 B1 | * | 5/2002 | Dowens et al. ............... 379/52 |
| 6,424,935 B1 | * | 7/2002 | Taylor .......................... 704/10 |
| 6,430,270 B1 | * | 8/2002 | Cannon et al. .......... 379/88.19 |
| 6,477,491 B1 | * | 11/2002 | Chandler et al. ........... 704/235 |
| 6,501,740 B1 | * | 12/2002 | Sun et al. ................... 370/261 |
| 6,600,725 B1 | * | 7/2003 | Roy .......................... 370/261 |
| 6,674,459 B2 | * | 1/2004 | Ben-Shachar et al. ... 348/14.09 |

\* cited by examiner

*Primary Examiner*—Fan Tsang
*Assistant Examiner*—J. Phan
(74) *Attorney, Agent, or Firm*—Leonard C. Suchyta, Esq.; Joel Wall, Esq.; Straub & Pokotylo (57) ABSTRACT

Recording and automated transcription methods and apparatus suitable for use in a communication system such as a telephone system are described. In one embodiment, a telephone system has a conference bridge, a transcription system, and multiple telephone sets connected to a central office (CO) switch via communication channels. Each telephone set lets its user transmit speech on first and second channels simultaneously. The CO switch selectively connects the first channel from each telephone being used in a conference call to the conference bridge. The bridge interconnects the first channels to establish a telephone conference. The CO switch selectively connects the second channels to the transcription system, which records the teleconference participants in separate recordings. The separate recordings are each time stamped and identified with a user's or communication unit ID. An automated speech-to-text (speech recognition) system transforms the recorded speech into textual data. A collator collates text segments generated from the speech obtained from different channels using the time stamps and the ID's to form a master transcript of textual data. The present invention can be used by single or multiple users. A single user may use the system of the present invention as a dictation system. The system can be used for automatically generating a transcript of a multi-party telephone conference or meeting.

24 Claims, 6 Drawing Sheets

FIG. 1

PRIOR ART

METHODS AND APPARATUS FOR PROVIDING SPEECH RECORDING AND SPEECH TRANSCRIPTION SERVICES

RELATED APPLICATIONS

This application is a continuation-in-part of U.S. Provisional Patent Application Ser. No. 60/065,952, titled "TELEPHONE COMMUNICATION METHODS AND APPARATUS" which was filed on Oct. 28, 1997, and which is hereby expressly incorporated by reference.

FIELD OF THE INVENTION

The present invention relates to the field of electronic communications and, more particularly, to apparatus and methods for providing recording and/or transcription services.

BACKGROUND OF THE INVENTION

Current communication systems provide a spectrum of services to subscribers. Many modern communication systems, e.g., telephone communication systems and telephone networks, readily allow human-to-human, computer-to-computer and human-to-computer interactions via the transmission of audio and data over communication channels. Connection system subscribers can now access such diverse communication services as call messaging, call screening, message retrieval, call waiting, call forwarding and teleconferencing from phones and computers. The Internet is an example of a communication system that is currently being used to transmit both voice and data signals and to interface computer systems and networks with existing telephone networks.

As competition between communication service providers, e.g., regional telephone companies, Internet service providers, long distance telephone service providers, etc., increases, service providers continue to look for new ways to distinguish themselves from their competitors and to increase revenues. New services often provide a way for communication services to distinguish themselves from their competitors while, at the same time, creating new sources of revenue.

In an attempt to provide new services and increase revenues, telephone and communication service companies have offered in recent years a host of new services. Such services often take advantage of existing technology such as speech recognition, the ability to make, store and transmit voice recordings and/or the ability to transmit scheduling information over the Internet.

Voice dialing telephone service is an example of modern telephone service which involve the use of speech recognition. Voice mail is an example of a service which takes advantage of the ability to make, store and transmit voice recordings. Telephone network initiated conference calling, where a conference bridge coupled to the Internet is used to initiate a multi-party conference call, is an example of a modern service which takes advantage of the ability to transmit scheduling information over the Internet.

Figure 1:
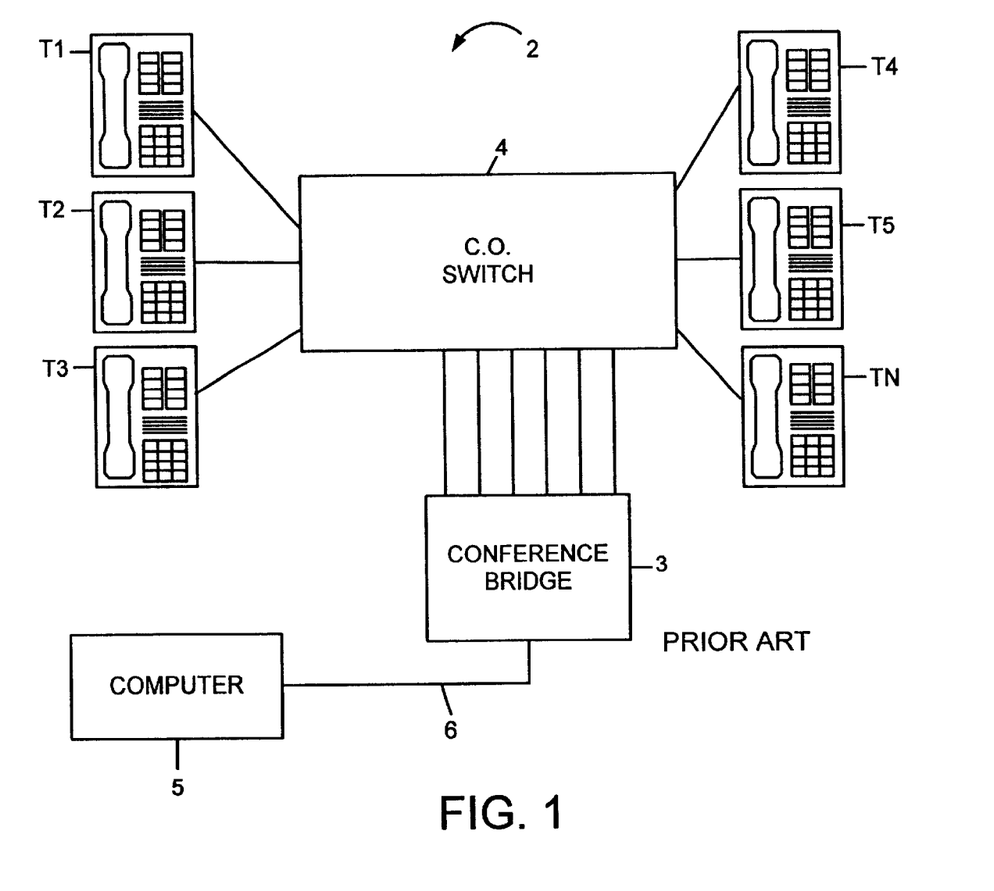
FIG. 1 illustrates a known system for providing a telephone conferencing service.

FIG. 1 illustrates a known telephone system 2 which includes a plurality of telephones T1–TN coupled to a telephone network conference bridge 3, via a central office telephone switch 4. A computer 5, located in the proximity of any one of the telephones T1–TN, can be used to transmit telephone conference scheduling information to the conference bridge 3 via the Internet 6 to schedule a telephone conference. The transmitted information may include, e.g., the time of the telephone conference and the telephone numbers assigned to the telephones which are to be used in the telephone conference. In the known system, the conference bridge initiates a telephone conference at the appointed time by calling each of the telephone numbers associated with a scheduled telephone conference and bridging the calls so that the audio received from any one phone is transmitted to all of the telephones involved in the scheduled conference call.

While the services discussed above, have proved useful to many subscribers and a worthy source of revenue to many communication service providers, there remains a need for new communication services which can be used to distinguish a communication service provider from its competitors and serve as a source of revenue. New communication services which augment or supplement existing services are particularly desirable because they can be used to maintain an existing subscriber base while helping to attract subscribers from competitor's services. Entirely new services which may be provided independent from existing services are also desirable as a new revenue source.

Telephone network hardware is maintained, updated and serviced by the communication service provider. Accordingly, services which can be implemented by adding or modifying a limited amount of network hardware, e.g., a peripheral server device, tend to be easier to implement on a large scale than services which require substantial new amounts of customer premise equipment. For this reason, new services which can be implemented by adding or modifying network hardware without requiring substantial changes to existing customer premise equipment tend to be more desirable than services which require new customer premise equipment or substantial modifications to customer premise equipment.

As will be discussed below, while some embodiments require new or modified customer premise equipment, e.g., telephones, many of the methods, apparatus, and services of the present invention can be implemented without the need for new customer premise equipment or substantial modifications to existing customer premise equipment.

SUMMARY OF THE INVENTION

As discussed above, the present invention relates to methods and apparatus for providing recording and/or transcription services, e.g., as part of a communication system.

The present invention provides a remotely located recording and/or transcription device coupled to one or more audio sources, e.g., telephones. One or more networking devices, e.g., telephone switches, may be used to couple the telephones to the recording and transcription device of the present invention.

In a single user embodiment, the recording device records the audio signal received from the audio source, e.g., a single telephone. It then transmits the recorded audio, e.g., speech, to a transcription device which performs a speech recognition operation on the received audio. A transcript, e.g., a set of text, generated by performing the speech recognition operation is produced and transmitted to the user of the service. Transcript delivery may be by way of an E-mail message, posting of the transcript on an Internet site to which the user has access, and/or by faxing the generated transcript to the user using a fax number provided by the user.

While the transcript device can be used to generate a transcript in real time, the system of the present invention need not be implemented as a real time transcription device.

In one embodiment, the system of the present invention delivers transcripts minutes or hours after the audio input is received and recorded. This approach provides several advantages. First, because the transcription process is not performed in real time, the speech recognition task can be performed in a time period that is considerably longer than the duration of the speech upon which the recognition operation is performed. This allows for multiple speech recognition passes to be made using various speech recognition techniques, as is known in the speech recognition art, to improve recognition accuracy. It also allows for the speech recognizer to operate at a slower speed than would be required for real time speech recognition. Thus lower cost (slower) processors can be used to perform the speech recognition operation if desired. In addition, non-real time recognition facilitates the efficient use of a speech recognizer as a shared network resource since sequential processing of simultaneously received and recorded audio signals is made possible.

Implementing the speech recognizer used in the transcription system as a shared resource also allows for the use of a far more expensive, and potentially far more accurate, speech recognizer than individual users of the system could afford to purchase independently. The potential for providing transcripts with a greater degree of accuracy than most customer premise equipment would be able to provide, and the advantage of eliminating the need for customers to invest in transcription equipment is a feature which should appeal to many potential customers of the speech transcription services of the present invention.

While one embodiment of the present invention is directed to generating an audio recording and transcript from audio signals corresponding to a single user, other embodiment are directed to making transcripts from audio signals received from multiple sources, e.g., users. The multiple audio sources may be, e.g., different telephones operating in speaker phone mode placed in front of different individuals located in the same conference room or telephones responding to different individuals participating in a telephone conference.

In accordance with various embodiments of the present invention, a different communication channel is used to provide the audio originating from each separate audio source. The audio from each channel is recorded and a source identifier, e.g., telephone number is associated with the recording. Time and date stamps are included in the audio recording for subsequent use by the transcription device of the present invention. A conference ID may also be added to identify different recordings corresponding to the same conference.

Thus, in accordance with the present invention the speech from each member of a meeting or telephone conference for which a transcript is to be automatically generated is independently recorded. The recorded time stamps facilitate the subsequent correlation of the audio recorded from the separate channels and allows for a combined time correlated transcript to be generated using automated speech recognition techniques.

Automated speech recognition operations can be performed on the recorded audio to automatically generate text transcripts therefrom. Alternatively, all or portions of the recorded audio may be provided to human beings for transcription or to be used for other purposes.

In accordance with various embodiments of the present invention, each recorded audio channel is separately transcribed using automated speech recognition techniques. The generated transcripts corresponding to each separate audio source of a meeting or telephone conference is then combined into a composite transcript.

In one embodiment, the composite transcript includes an audio source identifier, e.g., telephone number or party name before each portion of text included in the transcript. Text segments corresponding to different audio sources are interleaved in the composite transcript in the order the speech segments occurred.

In the above described manner the methods and apparatus of the present invention provide communication service providers, e.g., telephone companies, the opportunity to provide a new service, e.g., a transcription service. In addition, it offers communication service providers which currently provide telephone conference service an enhanced form of the service, i.e., a telephone conference service with an automatic transcript generation feature.

Additional features, embodiments and advantages of the methods and apparatus of the present invention are discussed below in the detailed description which follows.

DETAILED DESCRIPTION

Figure 2:
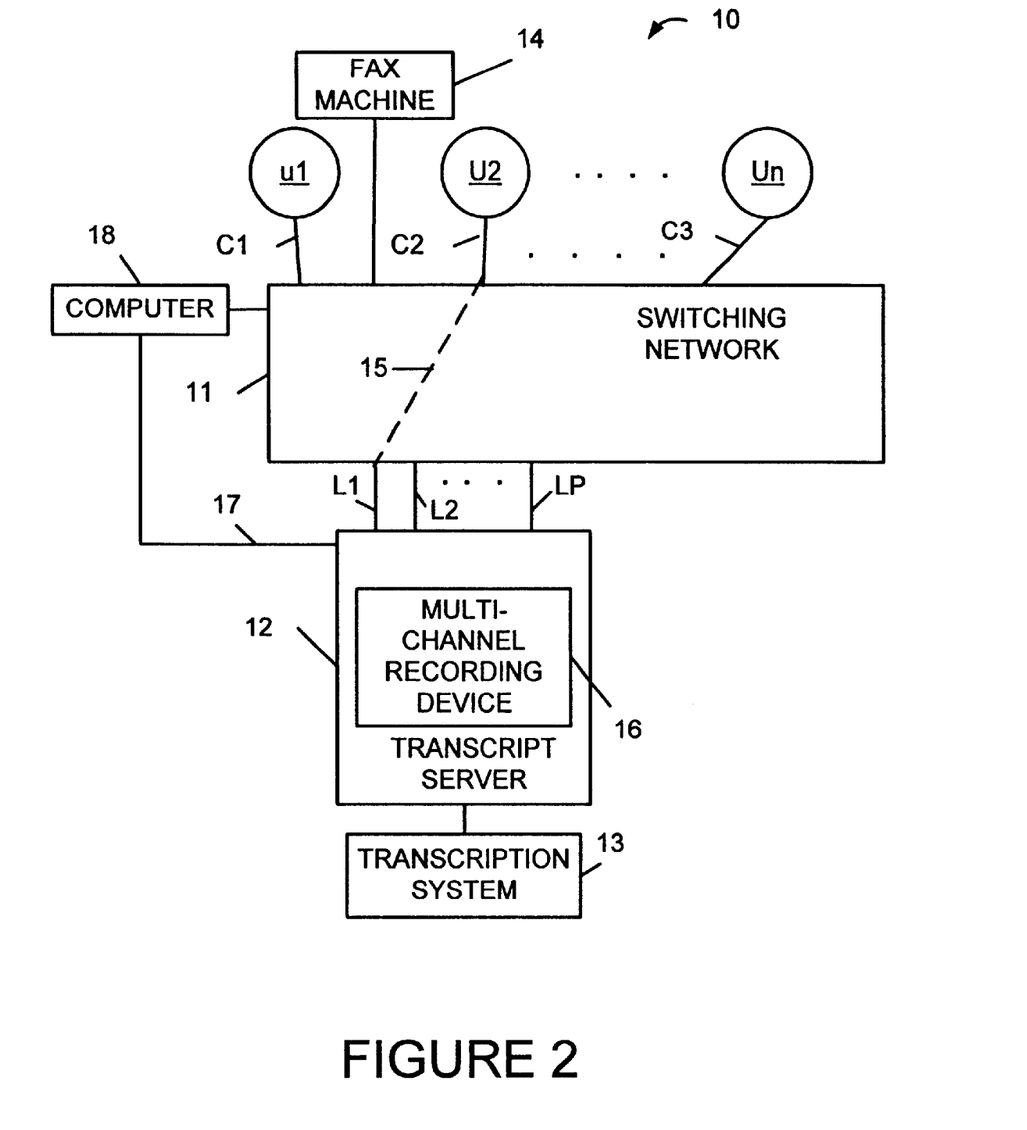
FIG. 2 is a generalized schematic diagram of an exemplary communication system having transcription services in accordance with one embodiment of the present invention.

FIG. 2 shows a voice communication system 10 of the present invention. The communication system 10 includes a switching network 11 coupled to (n) communication units U1, U2 and Un, e.g., telephones, via respective communication channels C1, C2 and Cn.

Switching network 11, which may be, e.g., a public telephone switching network, operates to selectively couple one or more of the communication units to a transcript server 12 via one or more of (p) communication channels L1, L2 and Lp. The communication units U1, U2 and Un are remotely located from the switching network 11 and transcript server 12. For example, the communication units and transcript server may be located in separate buildings, towns, or even different countries in the case of international telephone calls. Transcript server 12 communicates with transcription system 13. The transcript server 12 includes a multi-channel recording device 16 suitable for simultaneously recording audio signals received from multiple different communication units. The transcript server normally records audio signals from each communication channel separately. In various embodiments it also associates time/date stamps, communication unit ID information and/or conference Id information with each separate recording. The transcript server has the capability of providing the recording to the transcription system 13 which is coupled thereto. The transcription system performs a speech recognition operation on recordings received from the transcript server 12. The transcription system 13 has the capability of combining recognized speech from multiple channels into a composite transcript.

Figure 3:
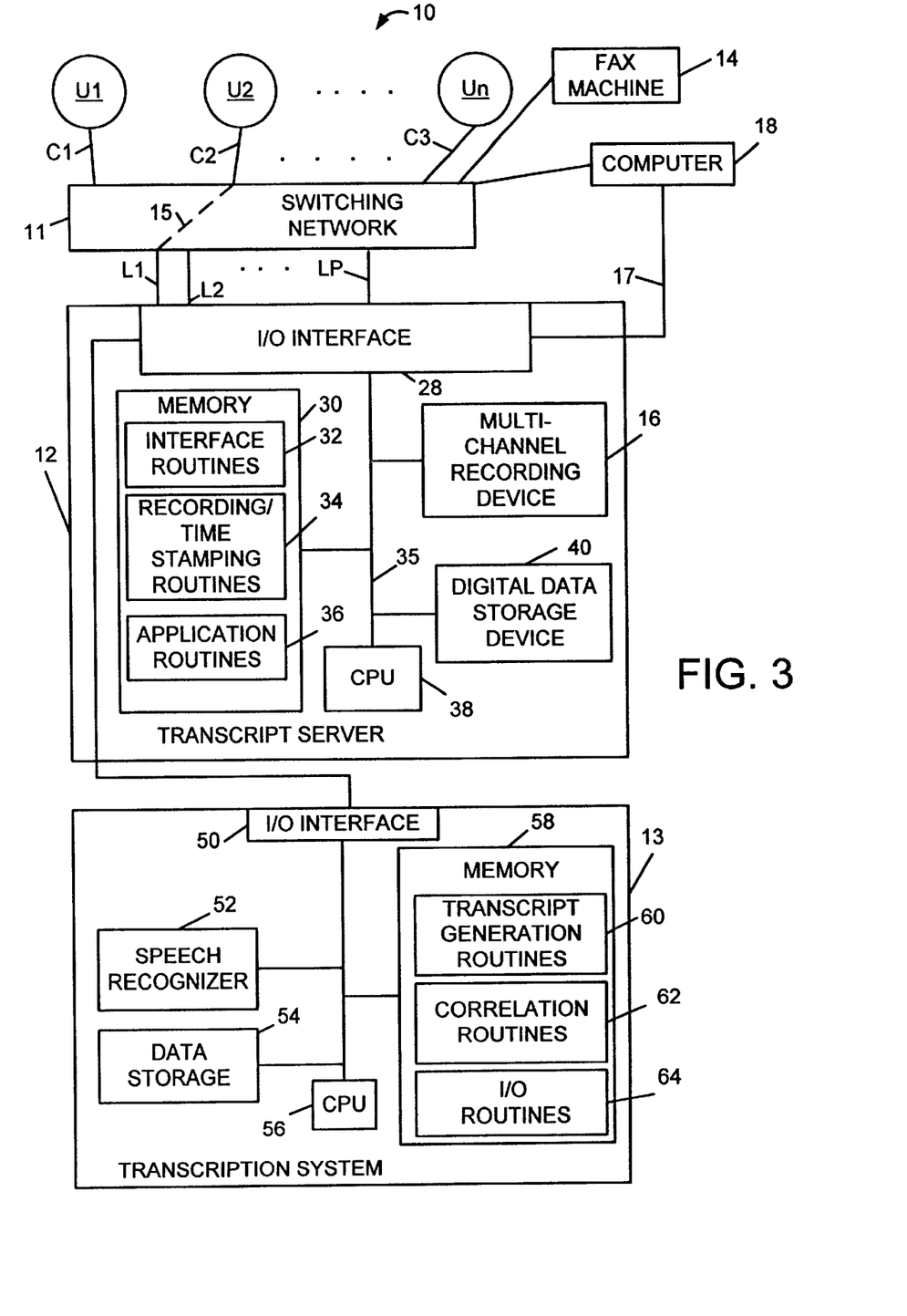
FIG. 3 is a more detailed diagram of the system of the present invention illustrated in FIG. 2.

FIG. 3 illustrates the communication system 10 of FIG. 2 in greater detail. As illustrated in FIG. 3, the transcript server 12 comprises an input/output (I/O) interface 28 which is responsible for interfacing between internal components of the server 12 and the various devices and communications channels coupled thereto including, e.g., the transcription system 13, the Internet 17 and communications channels L1 ... LP.

In addition to the I/O interface 28, the transcript server 12 comprises a memory 30, a CPU 38, the multi-channel recording device 16 and a digital data storage device 40. The storage device may be, e.g., a hard disk drive. These transcript server components 30, 38, 16 and 40 are coupled to each other and the I/O interface 28 by a common bus 35. The memory includes a plurality of routines which, upon execution by the CPU 38 control transcript server operation. The routines stored in memory 30 include interface routines 32 for controlling I/O operations, recording/time stamping routines 34 used for controlling the multi-channel recording device 16 and various other application routines 36, e.g., speech recognition, DTMF recognition, and call connection routines. The speech and DTMF recognition routines may be used by the CPU 38 to recognize transcript related identification information and delivery instructions provided by a user of the system.

The recording device 16 is capable of simultaneously generating a separate audio recording corresponding to each of the supported input channels L1 to LP. Recordings generated by the recording device 16 are stored in the data storage device 40 prior to transmission to the transcription system 13. The data storage device 40 may also be used for storing transcripts, in the form of electronic sets of text, provided by the transcription system 13 to the transcript server 12, e.g., for storage and delivery.

The transcription system 13 comprises an I/O interface 50, a speech recognizer 52, data storage device 54, a CPU 56 and memory 58 for storing various routines. The memory 58 includes transcript generation routines 60, text correlation routines 62 and I/O routines 64. It may also include speech templates and/or models used by the speech recognizer 52 to perform speech recognition. The transcript generation routines are responsible for controlling the CPU 56 to process the results of the speech recognition operations performed by the speech recognizer 52. A transcript is generated for each recording provided by the transcript server. The non-voice data, e.g., user ID, conference ID, time and date stamps included in the recording to which a transcript corresponds, are also included in the generated transcript.

The correlation routines 62 control the CPU 56 to generate a composite transcript from multiple transcripts which include the same conference ID. This may be done, as discussed above, by interleaving text from multiple transcripts as a function of the time stamps included therein. User or device ID information is normally inserted preceding each interleaved text segment to aid in identifying the source of the speech. Transcripts generated by the transcript generation routines and composite transcripts generated by the correlation routines are stored in the data storage device 54.

The I/O routines 64 are responsible for controlling communications between the transcript server 12 and the transcription system 13. Thus, the I/O routines 64 control the transmission of the completed transcript or transcripts to the transcript server.

Figure 4A:
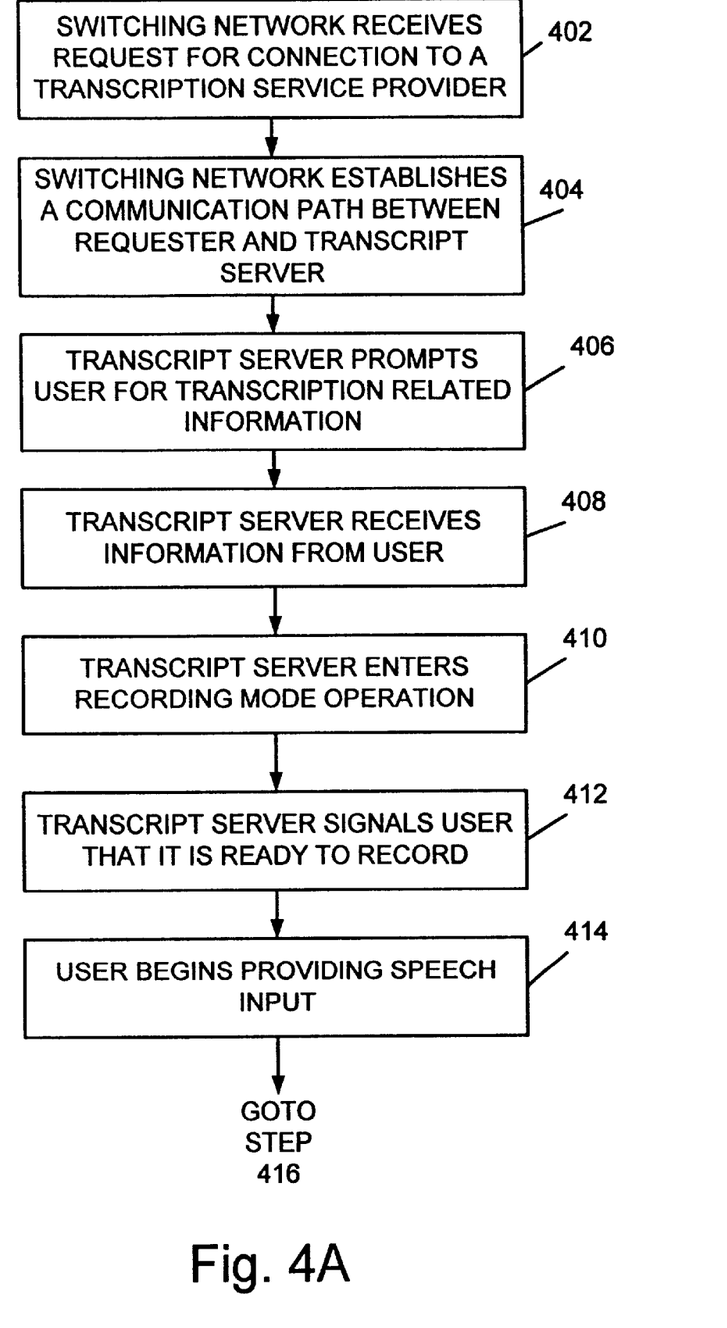
FIG. 4, which comprises the combination of FIGS. 4A and 4B, is a flow diagram, illustrating the operation of the communication system of FIGS. 2 and 3.
Figure 4B:
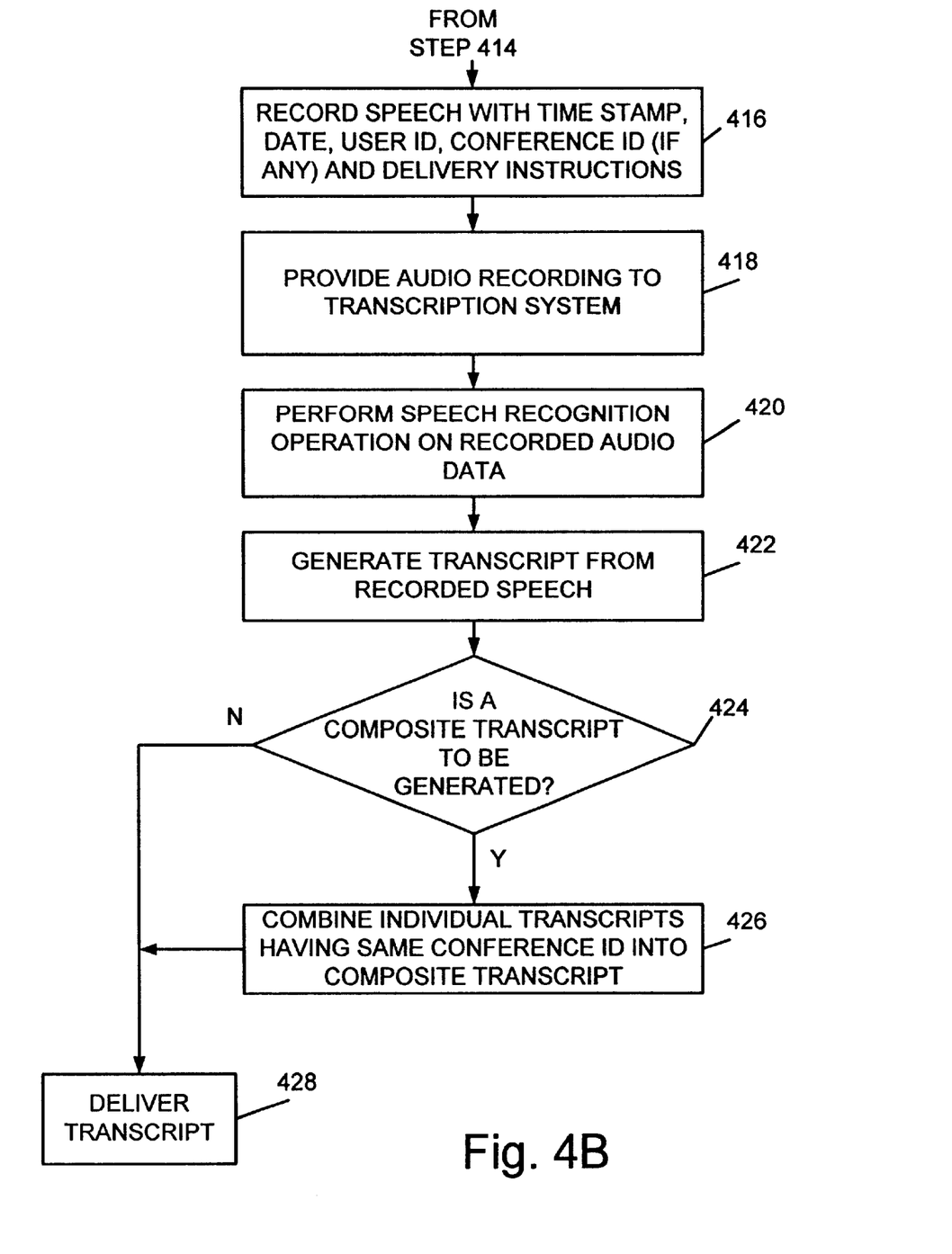

Operation of the system 10, in one exemplary embodiment of the present invention, will now be discussed in detail with reference to FIG. 4. FIG. 4 is a flow chart illustrating the steps involved with generating a transcript using the system 10 of the present invention.

During operation, switching network 11 receives requests for connection to a transcription service provider from one or more subscribers via communication units U1, U2 and Un. This event is represented in FIG. 4 as step 402. The request may be in the form of a telephone number corresponding to the transcript server 12. In response, in step 404 switching network 11 establishes a communication path between the requester's communication unit, say communication unit U2, to transcript server 12. The established communication path includes the corresponding communication channel C2 which couples the communication unit to the switching network, and an available communication channels L1–Lp, say channel L1, which couples the switching network to the transcript server 12. Dashed line 15 represents the switched connection established by switching network 11 linking communication channels C2 and L1.

In response to establishment of the communication path to the communication device U2, the transcript server, in step 406, prompts the user, i.e., the requester, to provide transcription related information. This may include a request for a speaker identifier, e.g., name, to be used in the transcript, and information on how the transcript is to be delivered, e.g., by fax, E-mail, etc. A request for speaker identifier information may be avoided by using automatic number identification (ANI) information provided by the switching network and an enhanced caller ID service which provides caller name and device ID (e.g., telephone number) information. The request may also include information requesting a conference ID used to identify which audio input should be combined into a composite conference transcript.

The user of the system can respond to the transcript server prompt either orally or via the use of DTMF signals (touch tones). Step 408 represents receipt of the requested information from the user. Upon receiving the requested information from the caller, the transcript server enters a recording mode in step 410. The transcript server 412 indicates that it is ready to begin recording by transmitting a signal to the user. The signal may be, e.g., an audio tone of the type commonly used by telephone answering machines to indicate readiness to begin recording.

In response to the transcription server ready signal, the requester begins providing speech input which is transmitted from communication unit U2 to server line L1 over communication channel C2. The transcript server 12 generates and stores, for each communication channel in use, a separate recording of any received speech, e.g., a digital audio recording. Time stamp, date, user ID, device ID, conference Id (if any) and the received transcript delivery information are also generated and recorded with the received audio. Recording of such information, at least in some embodiments, is optional. For example, where a composite transcript will not be generated, time stamp and conference ID information may be omitted from the recorded data. In addition, only one of the user and device Ids may be recorded and used subsequently as a speech source identifer.

Audio recordings produced by transcript server 12 are provided, in step 418, to transcription system 13. The transcription system 13 is responsible for performing, in step 420, an automated speech recognition operation on the recorded speech. The transcription system 13 generates, in step 422, a transcript, e.g., a set of text corresponding to recognized speech in the recording, for each recording received from the transcript server 12.

After a transcript is generated, in step 424 a determination is made by the transcription system 13 as to whether a composite transcript is to be produced. This check can be done by determining if the recording used to generate the transcript includes a conference ID indicating that the generated transcript corresponds to a portion of a conference.

In the case where transcripts of speech from multiple users are to be combined into a composite transcript, e.g., a transcript of a conference where a different one of the communication devices U1 . . . Un is used by each conference participant, a composite, e.g., time correlated, transcript is generated in step 426. This can, and in one embodiment is, done by time correlating and interleaving the text from the various transcripts corresponding to individual meeting participants of the same conference into a single composite transcript.

Transcript delivery is effected in step 428, in the FIG. 2 embodiment, via the transcript server 12. The transcript server 12 receives transcripts generated by the transcript system 13 and transmits them according to the received delivery instructions. Generated and/or composite transcripts may be delivered in step 428. Transcript delivery may be in electronic form, e.g., by transmitting an electronic version of the generated transcript as part of an E-mail, e.g., as a file attachment, to a computer 18 via, the Internet 17, a LAN connection, or another connection. The transcript may, alternatively, be posted on a server, e.g., the computer 18 that is coupled to the Internet. In such an embodiment the transcript can be accessed by multiple parties, e.g., the meeting participants. Alternatively, it can be faxed by the transcript server 12 via the switching network 11 to one or more fax machines 14 coupled thereto. The audio recordings from which the transcript was made can be delivered with the transcript if desired, except of course, in the case of fax delivery.

In an alternative embodiment, transcript delivery is performed by the transcription system 13, via an Internet or telephone connection via one of the above described transmission techniques. Such an embodiment has the advantage of not requiring further involvement by the transcript server in the transcript preparation and delivery process after the audio/data recordings are forwarded to the transcription system 13.

With delivery of the transcript in step 428, transcript generation and delivery is complete pending the next transcript generation request.

The above description of communication system 10 broadly outlines an exemplary recording and transcription embodiment of the present invention. It is contemplated that many variations, modifications and specific implementations are possible. The network formed by communication units U1–Un, communication channels C1–Cn, and switching network 11 may be implemented with a wide spectrum of conventional communications networks, such as an ordinary telephone system, an advanced digital data network, a packet switched network, or a cell switched (e.g., ATM) network. Communication units U1–Un may include analog and/or digital, e.g., ISDN, land-based telephone sets, mobile radio transceivers, or the like, while communication channels C1–Cn may include wire pairs, ISDN lines, microwave radio channels, optical fibers, coaxial cables, satellites, etc.

Transcript server 12 may be implemented as a computer-based system capable of providing management, storage and control functions for itself and transcription system 13. Electronic voice recognition devices having speech-to-text capabilities are well known. Such systems may be used, in accordance with the methods of the present invention, to implement transcription system 13.

Numerous modifications and variations of communication system 10, are contemplated and will be apparent to those skilled in the art in view of the present description. For example, any number of transcript servers 12 and/or transcription systems 13 may be used in the network and there need not be a one to one match between the number of transcript servers 12 and transcription systems 13. In addition, the transcription system 13 may be located at a site that is physically remote from the transcript server 12 with a single remotely located transcription system 13 servicing one or more transcript servers 12.

Figure 5:
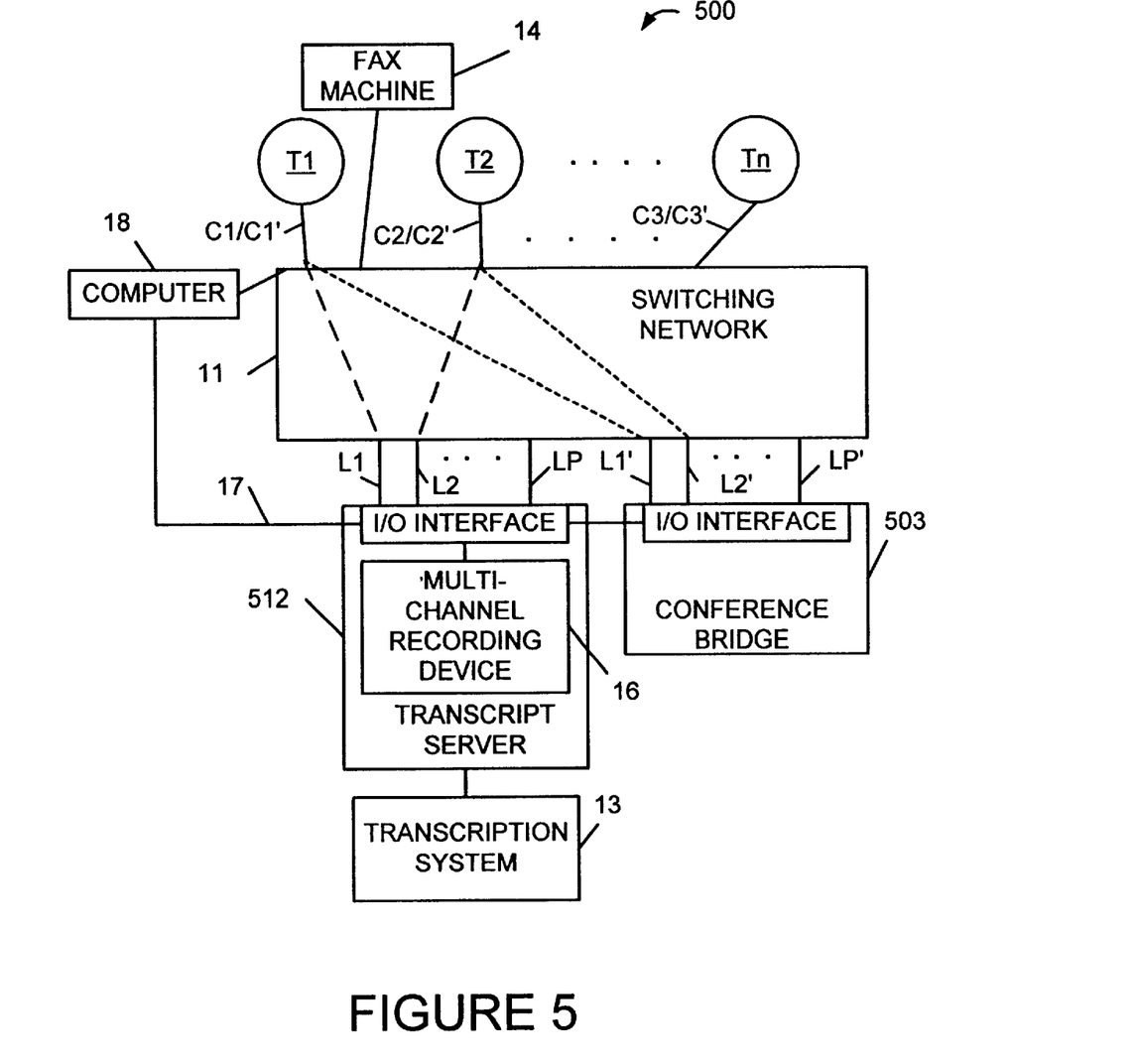
FIG. 5 is a diagram of a telephone conferencing system with automated speech transcription capabilities that may be implemented in accordance with an exemplary embodiment of the present invention.

FIG. 5 is a diagram of a telephone conferencing system 500 with automated speech transcription capabilities implemented in accordance with another embodiment of the present invention. Elements of the FIG. 5 embodiment which are the same as, or similar to, those of the earlier described embodiments are identified using the same reference numbers used in preceding figures.

As illustrated, the telephone conferencing system 500 includes a plurality of telephone devices T1, T2, Tn, a switching network 11, a computer 18, a fax machine 14, transcript server 512, transcription system 13 and a conference bridge 503. Each of the telephones T1, T2, . . . Tn are multi-line phones which are coupled to the switching network 11 via at least two communication channels. Telephone T1 is coupled to the switching network via communication channels C1 and C1'. In a similar manner, telephones T2 and Tn are coupled to the switching network 11 via communication channel pairs C2, C2' and C3, C3', respectively.

The switching network 11 may be part of a public telephone switching network. For example, the switching network 11 may be implemented using a central office telephone switch. In the FIG. 5 embodiment, the switching network is coupled to the transcript server 512 via (p) communication channels L1, L2, LP while the conference bridge is coupled to the switching network 11 via (p) communication channels L1', L2', LP'.

The transcript server 512 and conference bridge 503 each include I/O interfaces for interfacing with the communication channels coupled thereto and to one another. In the FIG. 5 embodiment, the transcript server 512 is similar in design to the FIG. 3 transcript server. However, the I/O interface of the transcript server 512 is used to couple the server 512 to the conference bridge 503 in addition to the other devices mentioned in the FIG. 3 embodiment.

The conference call automated transcription process of the present invention involves coupling a first communication channel associated with each one of the phones T1, T2, Tn which are to participate in a telephone conference, to the transcript server 512 while coupling the second communication channel associated with each one of the phones T1, T2, Tn, which are to participate in a telephone conference, to the conference bridge 503.

The conference bridge 503 operates to establish a bridge between the participating telephones using the second set of communication channels thereby establishing a telephone conference call. At the same time, the transcript server 512 initiates a recording operation which involves the recording of audio received via the first communication channels associated with each of the participating telephones. A separate recording is made from the audio received via each of the utilized first communication channels. In one such embodiment, telephone (device) ID information and a telephone conference Id is associated with each recording. In addition, the recordings are time and date stamped. Generation of a composite transcript and delivery of the composite transcript occurs in the same manner as described above in regard to the FIGS. 2 and 3 embodiments.

In accordance with the present invention the conference call may be scheduled and initiated in a variety of ways. For example, a conference call may be scheduled by the computer 18 contacting the transcript server 512 via the Internet and providing scheduling information thereto. Scheduling information may include the time the conference is to occur. The scheduling information can also identify the participants, e.g., by both primary and secondary communication channel telephone numbers. The transcript server 512 can assign a conference ID to the scheduled conference. At or near the time of the scheduled call, the telephone devices participating in the conference call dial, e.g., using pre-programmed telephone number information, both the transcript server 512 and the conference bridge 503. The participating telephones are programmed to provide microphone (audio transducer) signals directly to the first communication channel and to utilize the second communication channel in a conventional manner. In this manner, each of the first communication channels provides the contribution of a single conference participant to the transcript server 512 for recording and transcript generation purposes. At the time the transcript server 512 and conference bridge 503 are contacted, they each identify a calling device using caller ID and associate the assigned conference ID with the conference participants.

In response to the calls, the conference bridge 503 bridges the second communication channels of the conference participants while the transcript server generates independent recordings of the audio received via each of the first communication channels. The assigned conference Id and the detected caller (device) Id information is included with the generated audio recordings.

Consider for example a conference call involving telephones T1 and T2. Once the conference call is established, a first communication paths, represented in FIG. 5 using long dashed lines, will be established between telephones T1, T2 and the transcript server. One of these communication channels will carry the speech input from the user of telephone T1 while the other will carry the speech input from the user of telephone T2. Each channel will be recorded separately, with time and date stamps, by the transcript server 512 resulting in a recording of T1's contribution to the telephone conference and another recording of T2's contribution to the telephone conference.

The second communication channels associated with telephones T1 and T2 are coupled, as illustrated in FIG. 5 by the small dashed lines, to the conference bridge 503. The conference bridge bridges the second communication channels to establish the conference call. Accordingly, the second communications channels carry the speech contributions obtained from both T1 and T2.

While the conference call automated transcript generation processes of the present invention has been described in a scheduled conference call dial in embodiment, it is apparent that other techniques for initiating the conference call may be employed. For example, transcript server 512 can be programmed to dial the first telephone lines associated with each conference call participant while the conference bridge dials the secondary telephone numbers of each of the conference call participants. Other ways of establishing conference calls utilizing a first set of communication channels coupled to a transcript server 512 and a second set of communication channels coupled to a conference bridge 503 will be apparent to those skilled in the art, in view of the preceding discussion.

While the telephone conference transcription process of the present invention can be implemented using analog multi-line phones, ISDN phones are particularly well suited for use as the telephones T1, T2, Tn. ISDN lines support two data channels which can be used as independent communication paths. Thus, one ISDN channel can be used for coupling a telephone to the transcript server 512 while the second ISDN channel can be used to couple the same telephone to the conference bridge 503. As discussed above, the second channel would be used to carry the input of all telephone conference participants while the first channel would be used to carry only the contribution of the participant using the individual telephone. Alternative conference transcription embodiments including voice over data networks where data and/or other communication networks are used as opposed to telephone networks are contemplated. In such embodiments communication devices, e.g., H.323 international standard compliant devices with microphones may be used.

In view of the above discussion, it is apparent that the automated methods and apparatus of the present invention can be used to create transcripts corresponding to individuals, to groups of people attending a conference occurring at a single physical location, e.g., room, or to remotely located individuals participating in a telephone conference.

While the above discussion has focussed largely on the automated transcription methods and apparatus of the present invention, the audio recording methods and apparatus of the present invention may be useful independent of the transcript generation process. For example, it may be desirable to create and preserve separate audio recordings of the contributions of individual telephone conference participants.

The methods and apparatus of the present invention may also be used, e.g., to generate court transcripts and/or transcripts of other legal proceedings.

What is claimed is:

1. A transcription method comprising the steps of:
coupling a first audio source to an audio recording device using a first communication channel of a communications network, the first communication channel extending from the first audio source to said recording device;
coupling a second audio source to the audio recording device using a second communication channel of the communications network, the second communication channel extending from the second audio source to said recording device;
coupling the first audio source using a third communication channel to a conference bridge;
coupling the second audio source using a fourth communication channel to the conference bridge;
using the first communications channel in a unidirectional manner during a communications conference to communicate audio signals from the first audio source to said recording device;
using the second communications channel in a unidirectional manner during the communications conference to communicate audio signals from the second audio source to said recording device;

using the third communications channel in a bi-directional manner during the communications conference to communicate audio signals between said first audio source and said conference bridge;

using the fourth communications channel in a bi-directional manner during the communications conference to communicate audio signals between the second audio source and said conference bridge;

operating the recording device to generate a first audio recording of speech signals received from the first audio source;

performing a speech recognition operation on the first audio recording of speech signals to generate a first-:transcript therefrom;

delivering at least a portion of the generated first transcript; and wherein the first and second communications channels are separate from each other such that the audio signals on the first and second channels do not mix.

2. The method of claim 1, wherein the coupling step includes the step of using a telephone network to couple the audio source to the audio recording device.

3. The method of claim 1, wherein the step of operating the recording device to generate a first audio recording includes the step of recording time stamp information with the audio being recorded in said first audio recording.

4. The method of claim 3, further comprising the step of:

operating the second recording device to generate a second recording of speech signals received from the second audio source;

performing a speech recognition operation on the recorded speech signals included in the second recording to generate a second transcript therefrom.

5. The method of claim 4, wherein the step of operating the recording device to generate a second recording includes the step of recording time stamp information with the second recording.

6. The method of claim 5, further comprising the step of:

generating a composite transcript from the first and second transcripts.

7. The method of claim 6, wherein the step of generating a composite transcript includes the step of:

interleaving segments of text included in the first and second transcripts to generate the composite transcript.

8. The method of claim 7, wherein the step of interleaving segments of text is performed as a function of the recorded time stamp information.

9. The method of claim 7, wherein the step of generating a composite transcript further includes the step of:

inserting before each interleaved segment of text, an identifier indicating the source of the text.

10. The method of claim 1, wherein the first audio source is a first multi-line telephone and said second audio source is a second telephone;

wherein coupling the first audio source using a third communications channel to a conference bridge includes placing a telephone call to said conference bride from said first telephone; and wherein coupling the first audio source using a first communication channel to the recording device includes placing a telephone call to said recording device from said first telephone.

11. The method of claim 10, further comprising the steps of:

generating a second recording of speech signals received from the second audio device;

performing a speech recognition operation on the recorded speech signals to generate a second transcript therefrom.

12. The method of claim 11, further comprising the step of:

generating a composite transcript from the first and second transcripts.

13. The method of claim 12, wherein the step of delivering at least a portion of the generated first transcript includes the step of transmitting the composite transcript to a transcript service subscriber.

14. The method of claim 12, wherein the step of delivering at least a portion of the generated first transcript includes the step of transmitting the composite transcript to a transcript service subscriber through the use of one of an E-mail message, an Internet communication, and a facsimile transmission.

15. The method of claim 1, wherein performing a speech recognition operation on the recorded audio speech signals includes:

performing multiple speech recognition passes on said recorded audio speech signals.

16. A method of processing audio signals, comprising the steps of:

coupling a first audio source to an audio recording device using a first communication channel, the first communication channel extending between said first audio source and said audio recording device;

coupling the first audio source to a conference bridge using a second communication channel;

coupling a second audio source to the recording device using a third communication channel, the third communication channel extending between said second audio source and said recording device;

coupling the second audio source to the conference bridge using a fourth communication channel, said first, and third communication channels being separate from each other such that audio signals on the first and third communications channels do not mix;

using the first communications channel in a bi-directional manner during a communications conference to communicate audio signals from the first audio source to said recording device;

using the second communications channel in a bi-directional manner during said communications conference communicate audio signals from the second audio source to said recording device;

using the third communications channel in a uni-directional manner during said communications conference to communicate audio signals between said first audio source and said conference bridge; and using the fourth communications channel during said communications conference in a bi-directional manner to communicate audio signals between the second audio source and said conference bridge.

17. The method of claim 16, further comprising the step of:

operating the conference bridge to bridge the second and third communication channels.

18. The method of claim 17, further comprising the step of:
operating the recording device to generate a first recording of audio received from the first audio source an to generate a second recording of audio received from the second audio source.

19. The method of claim 18, further comprising the steps of:
generating a first transcript from the first recording using a speech recognizer; and
generating a second transcript from the second recording using the speech recognizer.

20. The method of claim 19, further comprising the step of generating a composite transcript from the first and second recordings.

21. The method of claim 18, wherein said first and second audio recordings are generated simultaneously, the method further comprising the steps of:
operating speech recognizer to sequentially process the first and second audio recordings; and
generating a transcript from the output of said speech recognizer.

22. A communication system with conferencing and transcribing services comprising:
a conference bridge;
speech transcript means having a plurality of inputs for converting speech signals received on said inputs into textual data without mixing the audio signals received on said plurality of inputs;
a plurality of paired first and second communication channels, each first communications channel serving as a bi-directional communications channel, each of said second communications channels serving as a uni-directional communications channel; and
switch means connected to said first and second communication channels for selectively connecting a number of said first communication channels to the conference bridge to thereby provide a bridged set of communications channels, and for connecting corresponding second communication channels to different inputs of said speech transcript means, said switch means connecting the second communication channels to said transcript means without mixing the audio from said second communications channels.

23. The system of claim 22, wherein said speech transcript means includes a recorder means, having a speech recording circuit for making a set of separate recordings of said speech signals transmitted on said different ones of said corresponding second communication channels in parallel.

24. The system of claim 23,
wherein said speech transcript means includes a speech-to-text system; and
wherein said recorder means includes means for inserting into recordings time stamp information.

* * * * *